US006959294B2

(12) United States Patent
Sullivan et al.

(10) Patent No.: US 6,959,294 B2
(45) Date of Patent: Oct. 25, 2005

(54) CONTEXT-BASED HELP ENGINE AND DYNAMIC HELP

(75) Inventors: Timothy Rand Sullivan, Seattle, WA (US); Justin Shane McRoberts, Seattle, WA (US); Victor Stone, Mercer Island, WA (US); Craig Andrew Critchley, Fall City, WA (US); Derek Edward Hoiem, Sammamish, WA (US); Peter Loforte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 10/100,714

(22) Filed: Mar. 19, 2002

(65) Prior Publication Data

US 2003/0016238 A1 Jan. 23, 2003

Related U.S. Application Data

(60) Provisional application No. 60/304,107, filed on Jul. 10, 2001.

(51) Int. Cl.$^7$ ................................................ G06N 5/02
(52) U.S. Cl. ............................ 706/50; 706/14; 706/12
(58) Field of Search ............................... 706/50, 14, 12

(56) References Cited

U.S. PATENT DOCUMENTS 6,615,240 B1 * 9/2003 Sullivan et al. ............. 709/205
2002/0083025 A1 * 6/2002 Robarts et al. ............... 706/12

OTHER PUBLICATIONS

D. Ford, Online context–sensitive help, 1989, Journal of Pascal, 8(6), 34–41, 44–55.*
Annya Romanczuk–Requile, A Context Help System Based on Intelligent Diagnosis Processes Aiming to Design and Maintain Object–Oriented Software Packages, 1998, ECOOP Workshop Reader, 64–65.*

Ford, D. "Online context–sensitive help", *Journal of Pascal, Ada & Modula*–2, 1989, 8(6), 34–41, 44–55.

Gaines, B.R. et al., "An Integrated knowledge support system", *FGCS, Fifth Generation Computer Systems*, 1992, 2, 1157–64.

Kay, D.B. "Why Mosiac isn't enough", *16$^{th}$ National Online Meeting Proceedings*, 1995, 211–15.

Romanczuk–Requile, A. et al., "A context help system based on intelligent diagnosis processes aiming to design and maintain object–oriented software packages", *Object–Oriented Technology. ECOOP Workshop Reader*, 1998, 64–65.

Stevens, A., "Help for Windows help authors", *Dr. Dobb's Journal*, 1994, 4, 86–91.

Patrick, A. et al., "One proven methodology for designing robust online help systems", *Conference Proceedings. SIGDOC'93. The 11$^{th}$ Annual International Conference*, 1993, 223–32.

Young, D. et al., "Dynamic help: Automated online documentation", *ICSI, Proceedings of the Second International Conference on Systems Integration*, 1992, 448–57.

* cited by examiner

Primary Examiner—Joseph P. Hirl
Assistant Examiner—J Hall
(74) Attorney, Agent, or Firm—Woodcock Washburn LLP.

(57) ABSTRACT

An application and a context-based help system operate on a computer. The application includes a plurality of components that effectuate application functions, where each component of the application is constructed to describe a current context of the component representative of a current state of the component. At least some of the components are active at any one time. The help system includes a help engine that receives the current context from each active component, dynamically builds a current overall context of the application based on each received current context, locates help topics based on the current overall context, and filters and prioritizes the located help topics.

38 Claims, 5 Drawing Sheets

CONTEXT-BASED HELP ENGINE AND DYNAMIC HELP

CROSS-REFERENCE TO RELATED APPLICATION

This application claims the benefit of U.S. Provisional Application No. 60/304,107, filed Jul. 10, 2001 under docket number '180599' and entitled "CONTEXT-BASED HELP ENGINE AND DYNAMIC HELP WINDOW", the subject matter of which is hereby incorporated by reference in its entirety.

TECHNICAL FIELD

The present invention relates to a mechanism for providing help in a dynamic manner to a user of an application or the like. More particularly, the present invention relates to such a mechanism that employs a context-sensitive help engine such that the user is presented with help topics that are relevant to a current overall context of the application.

BACKGROUND OF THE INVENTION

In using a software application or the like on a computer or the like, a user is often able to avail himself or herself of a help function built into or attached to the application. Such help function can be quite thorough and even exhaustive, and may contain a number of help topics or the like that can be accessed by way of an index of key words, a table of contents, or a search phrase, among other things.

Importantly, a user searching for one or more particular help topics must have at least a rough idea of the key words, contents section, or search phrase to employ to find such help topics. However, the user can easily be led astray by a bad choice, or may at times not even have any notion of where to start. Finding an appropriate help topic can easily become a frustrating and fruitless exercise, then.

In at least some applications and some instances with regard to such applications, and in an effort to alleviate the aforementioned situation, a particular portion or activity of the application may be linked directly to one or more help topics of the help function, where the linked-to pre-defined help topics presumably correspond to the particular portion. Accordingly, a user working at the particular portion of the application can merely actuate the link and immediately be directed to the pre-defined presumably corresponding help topics. For example, if the activity is saving a file worked on by the user with the application, a saving transaction may provide a help switch that when actuated by a user transfers such user to various 'save file' help topics.

In the aforementioned circumstance, the help function may be said to be activity-sensitive in that the help topics presented to the user are based on and relevant to the current activity of the application. However, such activity sensitivity does not take into account the current overall context of the application. That is, the topics displayed relate only to saving a file, and not to the type of file that is being saved, the way the file is being edited, the tools used to edit the file, any libraries employed to develop the file, any selections relating to the file, and the like. Put simply, the topics displayed are most likely pre-defined based only on the activity of saving a file. However, it may very well be that the user is interested in a help topic relating to another aspect of the current overall context of the application.

Accordingly, a need exists for a help engine that provides dynamic help to a user of an application based on the current overall context of the application. More particularly, a need exists for such a help engine that provides dynamic help that updates when the overall context of the application changes. Further, a need exists for such a help engine that models current overall context and obtains, prioritizes, and displays help topics based thereon, whereby the displayed help topics are of interest and help to the user.

SUMMARY OF THE INVENTION

The aforementioned need is satisfied by the present invention in which an application and a context-based help system operate on a computer. The application includes a plurality of components that operate to effectuate application functions, where each component of the application is constructed to describe a current context of the component representative of a current state of the component. At least some of the components are active at any one time.

The help system includes a help engine that operates to receive the current context from each active component, to dynamically build a current overall context of the application based on each received current context, to locate help topics based on the current overall context, and to filter and prioritize the located help topics.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
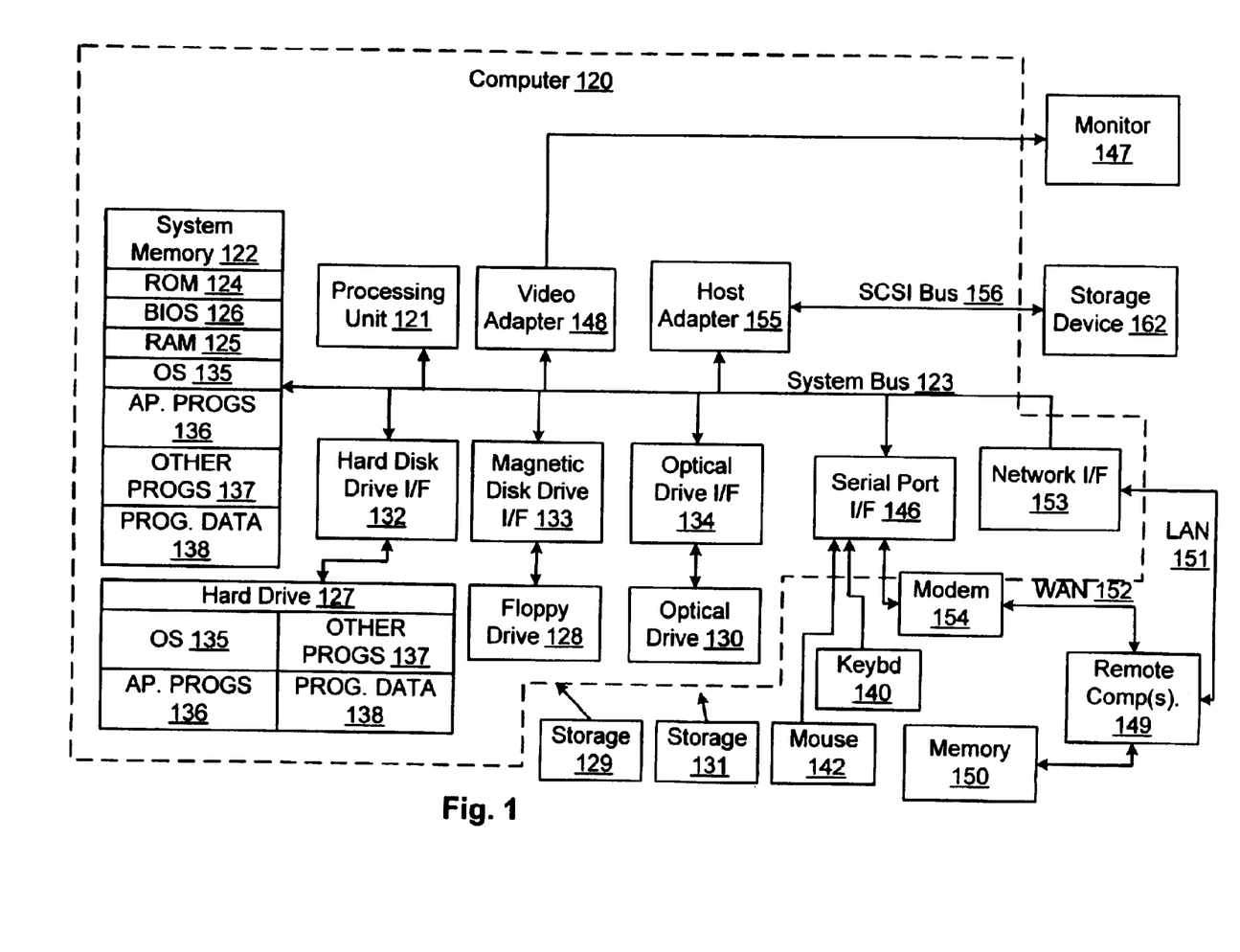
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

The overall goal of the present invention is to provide a help function or engine in connection with a particular application or the like, where the help engine delivers help topics to a user of the application that are relevant to the current overall context of the application with a minimal amount of effort from the user. To deliver relevant help, the help engine obtains or is provided with a current status of what the user wants to accomplish based on what the user has done and is doing in connection with the application. In particular, the current status is represented as a model of the current overall context using string-based attributes and keywords.

Figure 2:
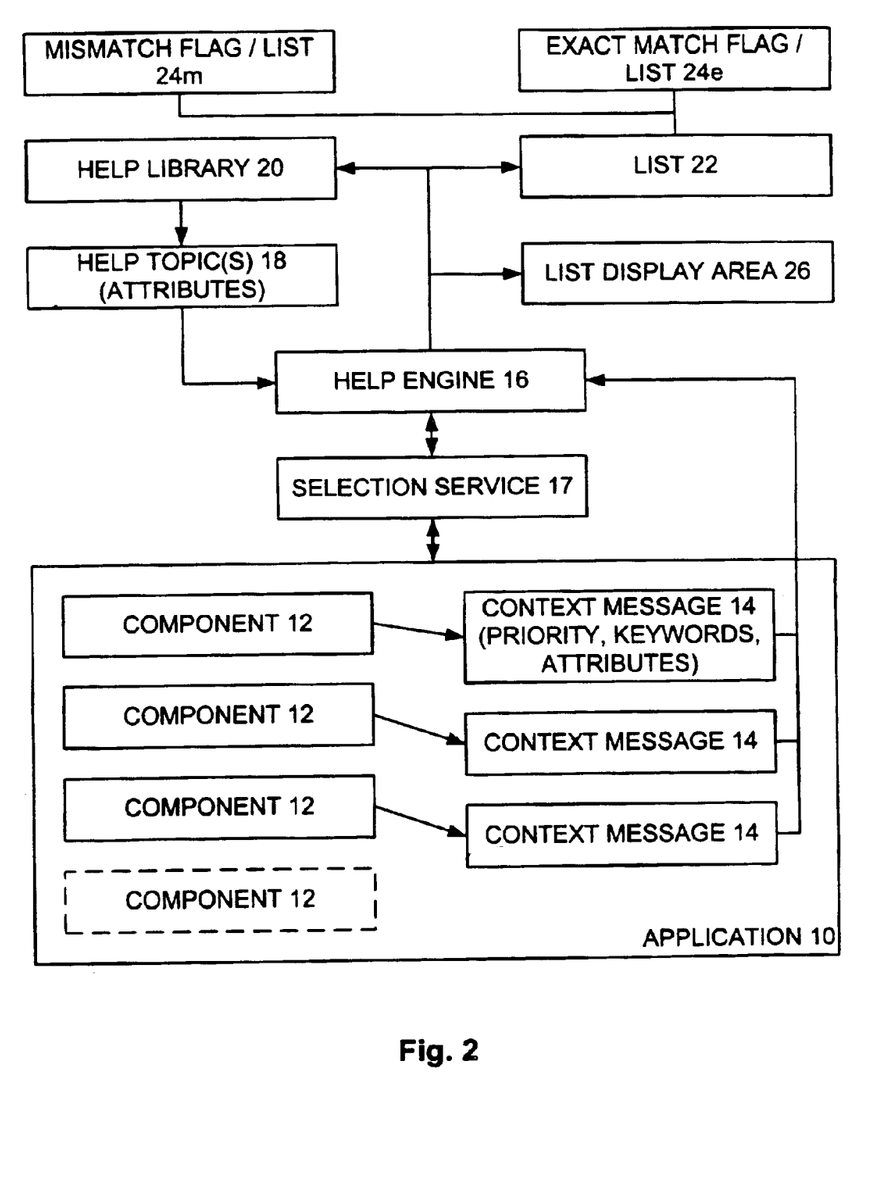
FIG. 2 is a block diagram showing the structure of a context-based help system in accordance with one embodiment of the present invention.

In the present invention, and referring now to FIG. 2, a user employs an application 10 or the like by way of a computer such as the computer 120 of FIG. 1 or the like. The application 10 may be any appropriate application without departing from the spirit and scope of the present invention. For example, the application 10 may be a drawing application, a word processing application, a controller, or even an operating system. Also, the application 10 may be operating on the computer 120 or may be operating remotely from the computer 120 without departing from the spirit and scope of the present invention. While it is to be appreciated that the present invention is particularly suited for a relatively complex application 10, the application 10 may instead be relatively simple, again without departing from the spirit and scope of the present invention.

As seen in FIG. 2, the application 10 includes one or more components 12. As may be appreciated, the components 12 of the application 10 vary from application 10 to application 10, and in essence work together to perform and/or effectuate the various functions incumbent in the application 10. For example, the components 12 may include a library of selectable elements, a selection device for selecting elements from the library, a rendering device for rendering a selected element, a tray for holding the selected element, a tray organizer for organizing multiple ones of the tray, etc. Note that a component 12 may be more conceptual (a tray, for example) or may be more concrete (a library, for example) without departing from the spirit and scope of the present invention.

In one embodiment of the present invention, each of at least some of the components 12 of the application 10 is constructed or enabled to describe a current context of the component 12 by providing a context message 14 having a description of the current context of such component 12. Note that a context message 14 may include a pointer or linkage to information contained elsewhere, where such information is in effect a sub-context message 14 as provided by a sub-component 12 of the component 12. In one embodiment of the present invention, the current context as represented by a context message is described by way of string-based keywords and/or name/value attribute pairs. As should be appreciated, though, the current context of a component 12 as set forth in a corresponding context message 14 may be described in other forms without departing from the spirit and scope of the present invention.

Note that the keywords and attributes in a context message 14 are specific to the corresponding component 12 and thus vary from component 12 to component 12. Moreover, the keywords and attributes in a context message 14 from a component 12 may vary based on the current context of the component 12. Further, the keywords and attributes may be supplied in a manner decided upon by the corresponding component 12, or in a manner decided upon by an entity external to the corresponding component 12. At any rate, the keywords and attributes in a context message 14 may be any appropriate keywords and attributes without departing from the spirit and scope of the present invention, as long as such keywords and attributes provide information from which the current context of the corresponding component may be deduced.

Each component 12 of the application 10 is responsible for creating and maintaining its own context message 14. That is, the component 12 updates the context message 14 thereof with new keywords and/or attributes and removes old keywords and/or attributes to reflect actions taken by the user. A context message 14 from a component 12 may contain keywords only, attributes only, or some combination of the two. As will be explained in more detail below, the keywords in a context message 14 are employed to locate help topics, and the attributes in a context message are employed to filter and prioritize the located topics. Each context message 14 may be static or dynamic. In the latter case, the context message 14 is based on current conditions with regard to the corresponding component 12, and represents a current context of such component 12.

It is to be appreciated that not every component 12 is active at all times while an application is in operation. For one example, in a word processing application 10 that can operate on multiple document components 12, only one document component 12 is being worked on (i.e., is 'in focus') at a time. For another example, only one thesaurus library component 12 might be used at any one time. Conversely, some components 12 are active at all times. For one example, in the aforementioned word processing application 10, a document selection manager component 12 is always operating to be able to select a document to be in focus. For another example, a thesaurus selection manager component 12 is always operating to select a particular thesaurus for use. Accordingly, it is to be appreciated that the overall current context of an application 10, at least for purposes of generating help in connection therewith, should be based on the components 12 that are currently active or operating (i.e., 'in focus'), and not on other components 12 that are either not active or operating or are idle (i.e., 'out of focus').

In the present invention, then, each component 12 that is in focus provides a context message 14 describing the context of such component 12 to a help engine 16, and the help engine 16 dynamically builds the current overall context of the application 10 based on such provided context messages 14. In particular, as each component 12 comes into focus, such component 12 provides the corresponding context message 14, and the help engine 16 incorporates such context message 14 with other context messages 14 from other in-focus components 14 to dynamically build the current overall context of the application 10. Correspondingly, whenever a component 12 goes out of focus, the corresponding context message 14 is removed from the purview of the help engine 16 and the current overall context is re-built. Thus, the help engine 16 maintains the current overall context of the application 10 in an accurate and up-to-date manner, where such current overall context shows which components 12 the user is accessing and what the user is doing within each accessed component 12.

Figure 3:
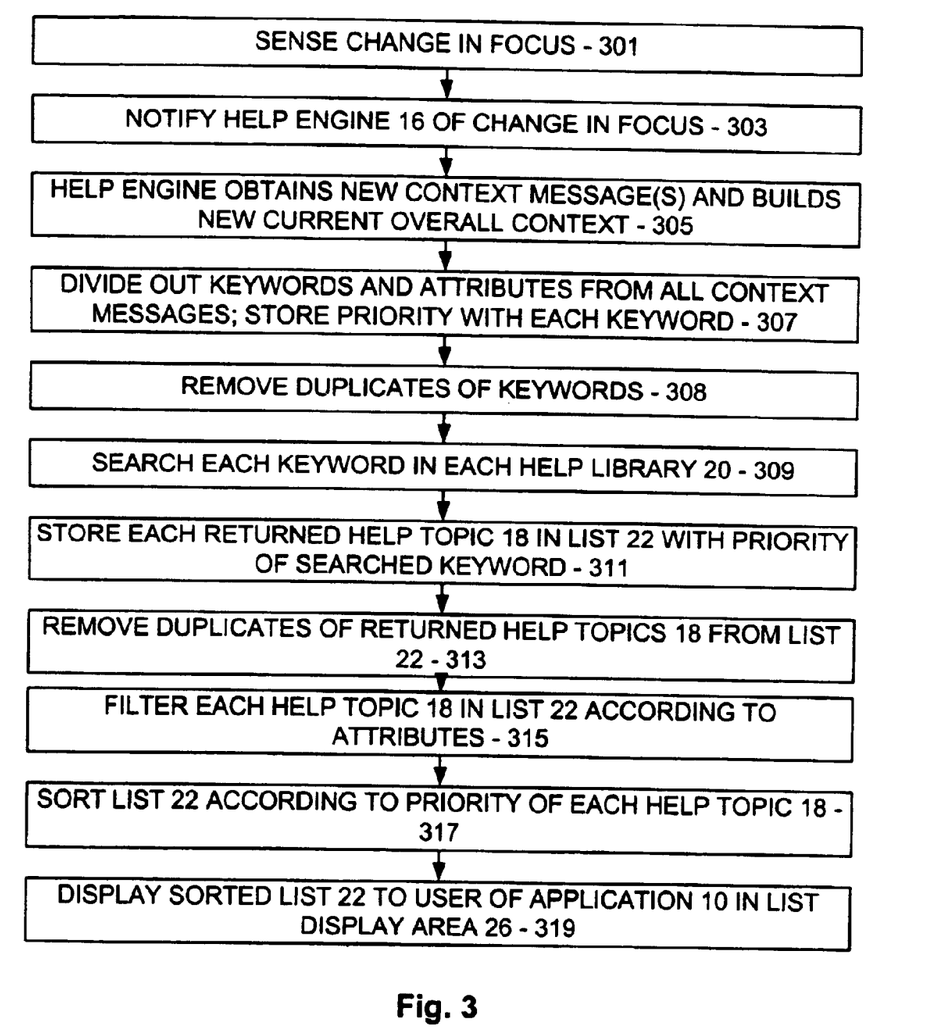
FIG. 3 is a flow diagram showing a method performed in connection with the help system of FIG. 2 in the course of providing dynamic help to a user in accordance with one embodiment of the present invention.

In one embodiment of the present invention, the application 10 and/or the computer 120 includes a selection service 17 that senses whenever a change of focus occurs in the application 10 (step 301, FIG. 3), and the selection service 17 notifies the help engine 16 of such change and in particular which components 12 have been affected by the change (step 303, FIG. 3). Thereafter, based on the change, the help engine 16 discards appropriate ones of the context messages 14 and/or obtains from each of appropriate ones of the components 12 a new context message 14 therefrom (step 305, FIG. 3). Of course any other appropriate methodology for obtaining context messages 14 may be employed without departing from the spirit and scope of the present invention.

Significantly, based on the built current overall context, the help engine 16 retrieves help topics 18 from one or more help libraries 20, evaluates and prioritizes the retrieved topics 18, and displays linkages to the topics 18 based on the prioritization. Such linkages may for example appear to the user in a portion of the monitor 147 (FIG. 1) of the computer 120. As may be appreciated, each help engine 16 may be local to or remote from the application 10. Likewise, the help libraries 20 may be local to or remote from the application 10 and/or help engine 16. In the event that the help engine 16 and or help libraries 20 are remote from the application 10, appropriate communicative links are required. Such links may be established in any appropriate manner, such as for example by a direct connection, Internet connection, Intranet connection, etc.

In one embodiment of the present invention, the help engine 16 retrieves the help topics 18 from each help library 20 based on the keywords from the context messages 14 from the in-focus components 12. In addition, the help engine evaluates and prioritizes the retrieved topics 18 based on the attributes from the context messages 14 from the in-focus components 12. The displayed linkages to the help topics 18 should be sorted from most relevant to least relevant.

As may be appreciated, by combining current contexts from multiple in-focus components 12 by way of the context messages 14 therefrom to form a current overall context of the application 10, the help topics 18 retrieved and prioritized by the help engine based on such current overall context better represent the range of help issues that the user of the application 10 may wish to review. Especially in a complex application that can have many different components 12 in focus at any one time, the current overall context as derived by the help engine 16 results in a range of help topics 18 made available to the user that represent not only the current activity of the user but also the current overall posture of the application 10 as employed by the user.

In one embodiment of the present invention, the help engine prioritizes help topics 18 based on a priority level attached to each context message 14 (FIG. 2), where the priority level represents a priority attached to the corresponding component 12. Attaching a particular priority to a particular component 12 may be done based on any particular criteria without departing from the spirit and scope of the present invention, as long as the priority of each component 12 bears some logical. For example, and in one embodiment of the present invention, the priority of each component 12 is based on the level of detail with which such user interacts with the component 12. Thus, a component 12 that the user is currently working with is given a relatively higher priority, while a shell component 12 is given a relatively lower priority. As may be appreciated, prioritizing each context message 14 allows the help engine 16 to match the current overall context very closely to what the user is actually doing with the application, no matter how complex that may be.

In particular, and assuming a relatively complex application 10 for working on multiple projects based on tools available from multiple libraries, it may be the case that the following components 12 are in focus, from least level of detail to most level of detail: a shell, a solution, a project manager, a project item, an editor, an editor selector, a tool library, and a tool selector. Thus, for each component 12, the following priority may be assigned:

| COMPONENT 12 | PRIORITY |
|---|---|
| SHELL | 100 |
| SOLUTION | 200 |
| PROJECT MANAGER | 300 |
| PROJECT ITEM | 400 |
| EDITOR | 500 |
| EDITOR SELECTOR | 600 |
| TOOL LIBRARY | 900 |
| TOOL SELECTOR | 1000 |

The context message 14 from the editor selector component 12 thereby includes a priority level of 600, the context message 14 from the tool selector component 12, includes a priority level of 1000, etc.

Suppose a user of the application 10 with the components 12 as set forth above has created a solution that includes a project item including tools from a tool library, and the user is working on a form within the project item with selection in the form on a button control. Then suppose that the user shows the tool selector and places selection on an item. In this scenario, each component 12 that is in focus provides a context message 14 to the help engine 16, where the context messages 14 are as follows:

Based on the context messages 14 as received by the help engine 16, and referring now to FIG. 3, the help engine 16 divides out the keywords and the attributes (step 307), as follows:

| PRIORITY | KEYWORD |
|---|---|
| 100 | Ambient |
| 500 | Designer_System Windows . Forms . Design . FormDocumentDesigner |
| 600 | System . Windows . Forms . Button |
| 900 | VS . Toolbox |
| 1000 | System . Windows . Forms . TextBox |

ATTRIBUTES attribute product=vb
attribute ShellMode=Design
attribute project=exe
attribute ProjType=LocalProj
attribute Item=vb
attribute Item=Project
attribute Devlang=VB
attribute SourceControl=FALSE Notably, in organizing the keywords and attributes, the help engine 16 need not retain any indication of the component 12 from which the keyword or attribute originated. However, and as will be explained in more detail below, the help engine should identify each keyword with the priority of the component 12 from which the keyword originated. Also notably, in organizing the keywords and attributes, duplicates of keywords and attributes are removed (step 308). In the case of duplicate keywords, the one having the highest priority may be kept.

In one embodiment of the present invention, the help engine 16 employs each keyword of the current overall context as a search in each help library 20 (step 309), where

| COMPONENT 12 | PRIORITY | KEYWORDS/ATTRIBUTES |
|---|---|---|
| SHELL | 100 | keyword=Ambient |
| | | attribute product=vb |
| | | attribute ShellMode=Design |
| SOLUTION | 200 | |
| PROJECT MANAGER | 300 | |
| PROJECT ITEM | 400 | attribute project=exe |
| | | attribute ProjType=LocalProj |
| | | attribute Item=vb |
| | | attribute Item=Project |
| | | attribute Devlang=VB |
| | | attribute SourceControl =FALSE |
| EDITOR | 500 | Keyword=Designer_System . Windows . Forms . Design. FormDocumentDesigner |
| EDITOR SELECTOR | 600 | Keyword=System . Windows . Forms . Button |
| TOOL LIBRARY | 900 | Keyword=VS . Toolbox |
| TOOL SELECTOR | 1000 | Keyword=System . Windows . Forms . TextBox |

Note that not all context messages 14 from components 12 include both attributes and keywords, and that in fact some include neither. Based on the context messages 14 above, the user has multiple projects, but the VB project is the active one as reflected by the 'product' attribute. Other attributes such as 'projtype' and 'project' provide additional information about what the user is working on.

each search results in one or more help topics 18 returned to the help engine 16. Note that each returned help topic 18 may be a record of the entire help topic 18 or a pointer or linkage device to the entire help topic 18. For each returned help topic 18, then, the help engine 16 stores such help topic 18 in a list 22 along with the priority of the keyword that was the basis of the search that resulted in such help topic 18

(step 311). Note that the list 22 includes all help topics 16 returned from all searches of all keywords in all help libraries 20. As will be explained below, the priority of each help topic 18 in the list 22 can later be employed to prioritize all the help topics 18 within the list 22.

Once the help engine 16 has searched all keywords of the current overall context in all help libraries 20 to form a complete list 22 of returned help topics 18, the list 22 may first be examined to remove duplicates of returned help topics (step 313). Alternatively, duplicates maybe removed as the list 22 is being compiled. In either case, when removing a duplicate of a help topic 18 from the list 22, the one having the highest priority may be kept.

Each help topic 18 in the complete non-duplicate list 22 is then filtered according to the attributes of the current overall context (step 315). As may be appreciated, filtering is usually if not always necessary especially inasmuch as all of searches of all of the keywords in all of the help libraries likely will result in the list 22 of returned help topics 18 being very long. In fact, in such long list 22, many of the returned help topics likely have minimal if any relevance or interest to the user.

Figure 4:
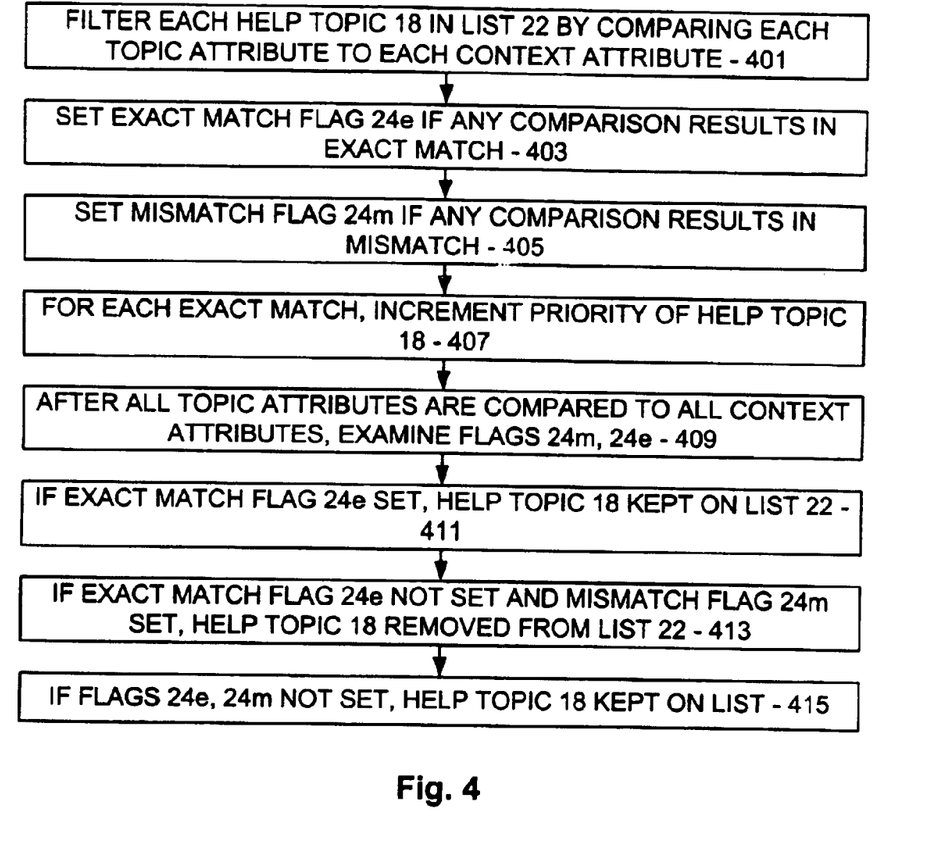
FIG. 4 is a flow diagram showing steps performed in connection with the method of FIG. 3 in culling returned help topics according to context attributes in accordance with one embodiment of the present invention.

In one embodiment of the present invention, and similar to each context message 14, each returned help topic 18 includes a set of attributes. Thus, in one embodiment of the present invention, and as seen in FIG. 4, the help engine 16 filters each help topic 18 in the list 22 by comparing each attribute of the current overall context ('context attribute') to each attribute of the help topic 18 ('topic attribute') (step 401). Bearing in mind that each attribute includes a name and a value, each attribute comparison can have one of three results: an exact match, where the name and value of the topic attribute matches the name and value of the context attribute; a mismatch, where the name of the topic attribute matches the name of the context attribute but the value of the topic attribute differs from the value of the context attribute; and a non-match, where the name of the topic attribute differs from the name of the context attribute.

In general, filtering works as follows. Each help topic 18 that results in an exact match is kept on the list 22. Moreover, and in one embodiment of the present invention, each time a help topic 18 experiences an exact match, the corresponding priority of the help topic 18 is incremented a certain amount. Such amount may be by 1, by 10, or any other appropriate value. In one embodiment of the present invention, the increment amount is chosen such that matching a large number of attributes does not rearrange the help topics 18 from their initial keyword-based priorities. That is, if a first help topic 18 has an initial relatively lower priority and a second help topic 18 has an initial relatively higher priority, the first help topic 18 should never achieve an incremented priority beyond that of the second help topic 18. In another embodiment of the present invention, the increment amount is chosen such that matching a large number of attributes can rearrange the help topics 18 from their initial keyword-based priorities.

As discussed below, the final list 22 is sorted by priority from most relevant to least relevant, and accordingly, incrementing the priority of any help topic 18 may affect the position of such help topic 18 within the sorted list 22. Moreover, it has been found at least empirically that incrementing the priorities of help topics 18 while filtering results in a sorted list 22 that is significantly more relevant to the user.

Each help topic 18 that results in a non-match is also kept on the list 22. While keeping a non-match may seem counter-intuitive, it must be remembered that a non-match help topic 18 isn't necessarily irrelevant. Instead, a non-match help topic 18 is best characterized as having indeterminate relevance. Moreover, and in one embodiment of the present invention, a non-match help topic 18 is not incremented. Accordingly, a non-match help topic 18 and an exact match help topic 18 of same original priority will after filtering be prioritized correctly, at least with regard to each other.

A help topic 18 that results in one or more mismatches and no exact matches is removed from the list 22. Put another way, a help topic 18 with topic attributes that are not an exact match for any context attribute and yet are a mismatch for one or more context attributes may be described as being positively identified as irrelevant, and therefore need not be kept on the list. However, and importantly, in identifying a help topic 18 as resulting in a particular mismatch, the help topic 18 should not be removed from the list 22 immediately on the chance that such help topic 18 may later result in an exact match.

Accordingly, in one embodiment of the present invention, during examination of each help topic 18, an exact match flag 24e and a mismatch flag 24m are employed. In particular, while examining each help topic 18, the exact match flag 24e is set if any attribute thereof results in an exact match (step 403), and the mismatch flag 24m is set if any attribute thereof results in a mismatch (step 405). Processing of the help topic 18 with the corresponding mismatch and exact lists 24m, 24e and the list 22 is as follows. For each attribute of the help topic 18, an exact match increments the priority of such help topic 18 (step 407), as was discussed above, and causes setting of the exact match flag 24e (step 403). Similarly, for the attribute of the help topic 18, a mismatch causes setting of the mismatch flag 24m (step 405).

Once all the topic attributes of the help topic 18 have been compared to the context attributes, the flags 24m, 24e are examined (step 409). In particular, if the exact match flag 24e is set, the help topic 18 is kept on the list 22 regardless of the state of the mismatch flag 24m (step 411). However, if the exact match flag 24e is not set and the mismatch flag 24m is set, the help topic 18 is a 'pure' mismatch and is removed from the list 22 (step 413). Notably, if neither flag 24e, 24m is set, the help topic 18 is a non-match and is kept on the list, as was discussed above (step 415).

Figure 5:
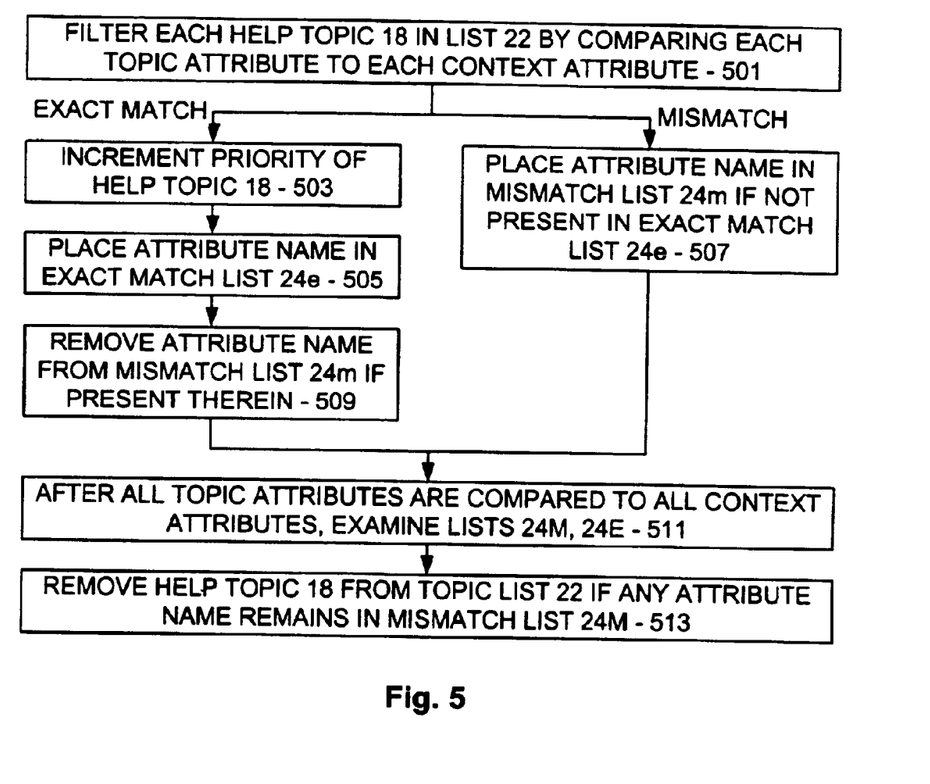
FIG. 5 is a flow diagram showing steps performed in connection with the method of FIG. 3 in culling returned help topics according to context attributes in accordance with another embodiment of the present invention.

In another embodiment of the present invention, and referring now to FIG. 5, the help engine 16 also filters each help topic 18 in the list 22 by comparing each context attribute to each topic attribute (step 501). However, each help topic 18 that results in an exact match is kept on the list 22 unless the help topic 18 results in a mismatch with regard to an attribute and not an exact match with regard to the same attribute. That is, even if the help topic 18 results in an exact match, the help topic 18 is removed if a topic attribute thereof results in a mismatch with a context attribute and no exact match with the same context attribute. Such an action is based on the presumption that the mismatched and not exact matched attribute positively identifies the help topic 18 as irrelevant despite any exact matched with regard to such help topic 18, and therefore need not be kept on the list.

Importantly, and similar to before, in identifying an attribute of a help topic 18 as resulting in a particular mismatch, the help topic 18 should not be removed from the list 22 immediately on the chance that such attribute of such help topic 18 may later result in an exact match. Accordingly, in one embodiment of the present invention, during examination of each help topic 18, an exact match list 24e and a mismatch list 24m are employed (FIG. 1). In particular, while examining each help topic 18, and while examining each topic attribute thereof, if the attribute results in an exact match, the priority of such help topic 18 is incremented (step 503), as was discussed above, and the attribute name is placed in the exact match list 24e (step 505). Names are never removed from the exact match list 24e. If the attribute results in a mismatch, and the attribute name is not already in the exact match list 24e, the attribute name is placed in the mismatch list 24m (step 507). In addition, as an attribute name is placed in the exact match list 24e (step 505), the mismatch list 24m is examined to determine if the attribute name exists therein. If so, the attribute name is removed from the mismatch list 24m (step 509).

Once all topic attributes of the help topic 18 have been compared to the context attributes, the lists 24m, 24e are examined (step 511). In particular, if any attribute names remain in the mismatch list 24m, then the help topic 18 is removed from the topic list 22 (step 513).

As should be appreciated, other methods of identifying a mismatch help topic 18 to be removed from the list 22 may be employed without departing from the spirit and scope of the present invention.

It is to be noted that in the course of searching and filtering help topics 18 according to keywords and context attributes, a help topic 18 may result from a search of a keyword from a context message 14 of a first component 12, and may be filtered according to a context attribute from a context message 14 of a second component 12. Empirically, it has been found that such 'cross-pollination' of keywords and context attributes across components 12 ultimately results in a better list 22 of searched and filtered help topics 18.

Once each help topic 18 has been examined in the manner set forth above, and returning now to FIG. 3, the list 22 hopefully has been culled significantly, and each remaining help topic 18 on such list has been prioritized according to the keyword that resulted in such help topic 18 and each exact match of a topic attribute thereof to a context attribute. The list 22 of help topics 18 may then be sorted according to the priority of each help topic 18 (step 317), from highest priority to lowest priority, and the sorted list 22 may then be displayed to the user of the application 10 in a list display area 26 on a monitor 147 (FIG. 1) of the computer 120 (step 319). Thus, the displayed list 22 in the list display area 26 is available to be perused by the user for help topics 18 that have already been determined to be relevant to the current overall context of the application 10. If each help topic 18 is a record of the entire help topic 18, the user can review a particular help topic 18 directly, while if each help topic 18 is pointer or linkage device to the entire help topic 18, the user can actuate the linkage for a particular help topic 18 and then review such help topic 18.

As should now be appreciated, the displayed list 22 of help topics 18 in the list display area 26 remains until the user changes focus in the application 10. As should also now be appreciated, at such time, a new current overall context is built based on the change in focus of the application as determined by the selection service 17 (steps 305–308), the help engine again searches each help engine 16 for help topics 18 based on keywords from the new current overall context (steps 309–313), culls and prioritizes each found help topic based on the attributes of the new current overall context (steps 315, 401–415), and sorts and displays a new list 22 of help topics 18 to the user in the list display area 26 (steps 317. 319).

As should be appreciated, and importantly, the present invention encompasses dynamically providing resources other than and/or in addition to help based on current overall context. Accordingly, in the present invention, help topics 18 includes not only help topics but samples, suggested next steps, suggested templates, suggested libraries, and the like, all based on current overall context. In addition, help topics 18 may include links that initiate actions for the user, such as invoking a wizard, running a macro, etc. The list display area 26, then, may include not only help topics 18, but other topics as well, all appropriately sorted and/or organized.

Moreover, the display area 26 may additionally include links that are not topics. For example, suppose in connection with an application 10 that several projects are integrated with several different source control systems. In such case, macros can be written to intelligently handle check-in/ check-out of the current file in the correct system. Especially if the application 10 has no built-in support for such functionality, links could be created to appear in the display area 26 such that the right check-in/check-out macro is made available based on the kind of file being edited. In this example, the display area 26 doesn't display a link to a topic of any kind, but instead provides easy and fast access to a product functionality and custom add-in/macro functionality.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful help engine 16 that provides dynamic help to a user of an application 10 based on the current overall context of the application 10. The help engine 16 provides dynamic help that updates when the current overall context of the application 10 changes, models such current overall context, and obtains, prioritizes, and displays help topics 18 based thereon, whereby the displayed help topics are of interest and help to the user.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. An application and a context-based help system operating on a computer, the application including a plurality of components that operate to effectuate application functions, each component of the application being constructed to describe a current context of the component representative of a current state of the component, at least some of the components being active at any one time, the help system including a help engine that operates to receive the current context from each active component, to dynamically build a current overall context of the application based on each received current context, to locate help topics based on the current overall context, and to filter and prioritize the located help topics, wherein each application describes the current context thereof by way of a member selected from a group consisting of at least one string-based keyword, and at least one name/value attribute pair, and wherein the help engine employs each keyword to locate the help topics and each attribute to filter and prioritize the located help topics.

2. The application and help system of claim 1 wherein the help topics include topics on a member of a group consisting of help, suggested samples, suggested next steps, suggested templates, and suggested libraries.

3. The application and help system of claim 1 wherein each component describes the current context thereof to the help engine as the component becomes active and the help engine incorporates such current context from such active component with current context from all other active components to dynamically build the current overall context of the application.

4. The application and help system of claim 1 wherein when an active component becomes inactive, the help engine removes the current context of such inactive component from the current context of all other active components to dynamically build the current overall context of the application.

5. The application and help system of claim 1 wherein each application describes the current context thereof in a context message.

6. The application and help system of claim 1 wherein the current context described by each component is dynamic and is based on current conditions with regard to the component.

7. The application and help system of claim 1 further comprising a selection service constructed to sense whenever a component of the application becomes active or inactive and to notify the help engine of such active or inactive component, wherein the notified help engine obtains the current context from the newly active component or discards the current context from the newly inactive component.

8. A method in combination with an application including a plurality of components that operate to effectuate application functions, each component of the application being constructed to describe a current context of the component representative of a current state of the component, at least some of the components being active at any one time, the method for providing dynamic help and comprising:

receiving the current context from each active component including a member selected from a group consisting of at least one string-based keyword, and at least name/value attribute pair;

building a current overall context of the application based on each received current context;

locating help topics based on each keyword of the current overall context; and filtering and prioritizing the located help topics based on each attribute in the current overall context.

9. The method of claim 8 further comprising sensing that a component of the application has become active or inactive, and comprising obtaining the current context from the newly active component or discarding the current context from the newly inactive component.

10. The method of claim 8, comprising locating help topics based on the current overall context in one or more help libraries.

11. The method of claim 8 further comprising displaying the filtered and prioritized help topics.

12. The method of claim 8 wherein each of the components of the application has a priority value, the method comprising:

receiving the current context from each active component including the priority value thereof;

dividing out all the keywords of the received current contexts and all the attributes of the received current contexts and identifying each keyword with the priority value of the component from which the keyword originated;

processing each of the divided-out keywords by:

searching the divided-out keyword in at least one help library;

receiving one or more help topics in response thereto; and storing each of the received help topics in a list along with the priority value of the divided-out keyword, whereby after processing all of the divided-out keywords the list is a complete list including all received help topics from all searches of all of the divide-out keywords in all of the help libraries along with a priority value for each received help topic; and filtering each help topic in the complete list according to each of the divided-out attributes; and sorting the filtered help topics in the complete list according to the priority value of each help topic.

13. The method of claim 12 wherein dividing out all the keywords includes removing duplicates of keywords.

14. The method of claim 12 further comprising removing duplicates of received help topics from the complete list.

15. The method of claim 12 further comprising displaying the sorted help topics, wherein the displayed help topics are available to be perused.

16. The method of claim 12 wherein each received help topic in the complete list includes a set of attributes, the method comprising filtering each help topic in the complete list by comparing each divided-out attribute ('context attribute') to each attribute of the help topic ('topic attribute'), wherein each context attribute and each topic attribute includes a name and a value, and wherein each attribute comparison can have one of three results: an exact match, where the name and value of the topic attribute matches the name and value of the context attribute; a mismatch, where the name of the topic attribute matches the name of the context attribute but the value of the topic attribute differs from the value of the context attribute; and a non-match, where the name of the topic attribute differs from the name of the context attribute.

17. The method of claim 16 comprising, after comparing each context attribute to each topic attribute of the help topic, keeping the help topic on the complete list if any comparison results in an exact match.

18. The method of claim 16 comprising, in the course of comparing each context attribute to each topic attribute of the help topic, incrementing the priority value of the help topic each time a comparison results in an exact match.

19. The method of claim 16 comprising, in the course of comparing each context attribute to each topic attribute of the help topic:

maintaining an exact match flag and a mismatch flag for the help topic;

setting the exact match flag if any comparison results in an exact match;

setting the mismatch flag if any comparison results in a mismatch; and examining the exact match flag and the mismatch flag of the help topic once all the topic attributes of the help topic have been compared to the context attributes to decide whether to keep the help topic on the complete list; the examination comprising:

keeping the help topic on the complete list if the exact match flag is set;

removing the help topic from the complete list if the exact match flag is not set and the mismatch flag is set; and keeping the help topic on the complete list if the exact match flag is not set and the mismatch flag is not set.

20. A computer-readable medium having stored thereon computer-executable instructions for effectuating an application and a context-based help system operating on a computer, the application including a plurality of components that operate to effectuate application functions, each component of the application being constructed to describe a current context of the component representative of a current state of the component, at least some of the components being active at any one time, the help system including a help engine that operates to receive the current context from each active component, to dynamically build a current overall context of the application based on each received current context, to locate help topics based on the current overall context, and to filter and prioritize the located help topics, wherein each application describes the current context thereof by way of a member selected from a group consisting of at least one string-based keyword, and at least one name/value attribute pair, and wherein the help engine employs each keyword to locate the help topics, and each attribute to filter and prioritize the located help topics.

21. The medium of claim 20 wherein the help topics include topics on a member of a group consisting of help, suggested samples, suggested next steps, suggested templates, and suggested libraries.

22. The medium of claim 20 wherein each component describes the current context thereof to the help engine as the component becomes active and the help engine incorporates such current context from such active component with current context from all other active components to dynamically build the current overall context of the application.

23. The medium of claim 20 wherein when an active component becomes inactive, the help engine removes the current context of such inactive component from the current context of all other active components to dynamically build the current overall context of the application.

24. The medium of claim 20 wherein each application describes the current context thereof in a context message.

25. The medium of claim 20 wherein the current context described by each component is dynamic and is based on current conditions with regard to the component.

26. The medium of claim 20 further having stored thereon computer-executable instructions for effectuating a selection service constructed to sense whenever a component of the application becomes active or inactive and to notify the help engine of such active or inactive component, wherein the notified help engine obtains the current context from the newly active component or discards the current context from the newly inactive component.

27. A computer-readable medium having computer-executable instructions thereon for implementing a method in combination with an application including a plurality of components that operate to effectuate application functions, each component of the application being constructed to describe a current context of the component representative of a current state of the component, at least some of the components being active at any one time, the method for providing dynamic help and comprising:

receiving the current context from each active component including a member selected from a group consisting of at least one string-based keyword, and at least name/value attribute pair;

building a current overall context of the application based on each received current context;

locating help topics based on each keyword of the current overall context; and filtering and prioritizing the located help topics based on each attribute in the current overall context.

28. The medium of claim 27 wherein the method further comprises sensing that a component of the application has become active or inactive, and comprising obtaining the current context from the newly active component or discarding the current context from the newly inactive component.

29. The medium of claim 27 wherein the method comprises locating help topics based on the current overall context in one or more help libraries.

30. The medium of claim 27 wherein the method further comprises displaying the filtered and prioritized help topics.

31. The medium of claim 27 wherein each of the components of the application has a priority value, the method comprising:

receiving the current context from each active component including the priority value thereof;

dividing out all the keywords of the received current contexts and all the attributes of the received current contexts and identifying each keyword with the priority value of the component from which the keyword originated;

processing each of the divided-out keywords by:

searching the divided-out keyword in at least one help library;

receiving one or more help topics in response thereto; and storing each of the received help topics in a list along with the priority value of the divided-out keyword, whereby after processing all of the divided-out keywords the list is a complete list including all received help topics from all searches of all of the divide-out keywords in all of the help libraries along with a priority value for each received help topic; and filtering each help topic in the complete list according to each of the divided-out attributes; and sorting the filtered help topics in the complete list according to the priority value of each help topic.

32. The medium of claim 31 wherein dividing out all the keywords includes removing duplicates of keywords.

33. The medium of claim 31 wherein the method further comprises removing duplicates of received help topics from the complete list.

34. The medium of claim 31 wherein the method further comprises displaying the sorted help topics, wherein the displayed help topics are available to be perused.

35. The medium of claim 31 wherein each received help topic in the complete list includes a set of attributes, the method comprising filtering each help topic in the complete list by comparing each divided-out attribute ('context attribute') to each attribute of the help topic ('topic attribute'), wherein each context attribute and each topic attribute includes a name and a value, and wherein each attribute comparison can have one of three results: an exact match, where the name and value of the topic attribute matches the name and value of the context attribute; a mismatch, where the name of the topic attribute matches the name of the context attribute but the value of the topic attribute differs from the value of the context attribute; and a non-match, where the name of the topic attribute differs from the name of the context attribute.

36. The medium of claim 35 wherein the method comprises, after comparing each context attribute to each topic attribute of the help topic, keeping the help topic on the complete list if any comparison results in an exact match.

37. The medium of claim 35 wherein the method comprises, in the course of comparing each context attribute to each topic attribute of the help topic, incrementing the priority value of the help topic each time a comparison results in an exact match.

38. The medium of claim 35 wherein the method comprises, in the course of comparing each context attribute to each topic attribute of the help topic:

maintaining an exact match flag and a mismatch flag for the help topic;

setting the exact match flag if any comparison results in an exact match;

setting the mismatch flag if any comparison results in a mismatch; and examining the exact match flag and the mismatch flag of the help topic once all the topic attributes of the help topic have been compared to the context attributes to decide whether to keep the help topic on the complete list; the examination comprising:

keeping the help topic on the list if the exact match flag is set;

removing the help topic from the list if the exact match flag is not set and the mismatch flag is set; and keeping the help topic on the list if the exact match flag is not set and the mismatch flag is not set.

* * * * *

UNITED STATES PATENT AND TRADEMARK OFFICE
CERTIFICATE OF CORRECTION

| | | |
|---|---|---|
| PATENT NO. | : 6,959,294 B2 | Page 1 of 1 |
| APPLICATION NO. | : 10/100714 | |
| DATED | : October 25, 2005 | |
| INVENTOR(S) | : Sullivan et al. | |

It is certified that error appears in the above-identified patent and that said Letters Patent is hereby corrected as shown below:

In column 8, line 10, delete "Designer_System Windows" and insert
-- Designer_System . Windows --, therefor.

In column 11, line 64, delete "(steps 317. 319)" and insert --(steps 317-319) --, therefor.

In column 13, line 56, in Claim 10, after "claim 8" delete ",".

Signed and Sealed this

Twenty-ninth Day of September, 2009

David J. Kappos
*Director of the United States Patent and Trademark Office*